United States Patent
Khot et al.

(10) Patent No.: US 8,350,891 B2
(45) Date of Patent: Jan. 8, 2013

(54) DETERMINING A VIDEOCONFERENCE LAYOUT BASED ON NUMBERS OF PARTICIPANTS

(75) Inventors: Gautam Khot, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 530 days.

(21) Appl. No.: 12/619,426

(22) Filed: Nov. 16, 2009

(65) Prior Publication Data

US 2011/0115876 A1   May 19, 2011

(51) Int. Cl.
*H04N 7/14* (2006.01)
(52) U.S. Cl. .................... 348/14.12; 348/14.08
(58) Field of Classification Search .......... 348/14.08, 348/14.1, 14.15, 14.16
See application file for complete search history.

(56) References Cited

U.S. PATENT DOCUMENTS

| | | | |
|---|---|---|---|
| 4,449,238 A | 5/1984 | Lee et al. |
| 4,686,698 A | 8/1987 | Tompkins et al. |
| 4,893,326 A | 1/1990 | Duran et al. |
| 5,014,267 A | 5/1991 | Tompkins et al. |
| 5,239,623 A | 8/1993 | Sato et al. |
| 5,365,265 A | 11/1994 | Shibata et al. |
| 5,374,952 A | 12/1994 | Flohr |
| 5,382,972 A | 1/1995 | Kannes |
| 5,398,309 A | 3/1995 | Atkins et al. |
| 5,453,780 A | 9/1995 | Chen et al. |
| 5,515,099 A | 5/1996 | Cortjens et al. |
| 5,528,740 A | 6/1996 | Hill et al. |
| 5,534,914 A | 7/1996 | Flohr et al. |
| 5,537,440 A | 7/1996 | Eyuboglu et al. |
| 5,572,248 A | 11/1996 | Allen et al. |
| 5,581,671 A | 12/1996 | Goto et al. |
| 5,594,859 A | 1/1997 | Palmer et al. |
| 5,600,646 A | 2/1997 | Polomski |
| 5,617,539 A | 4/1997 | Ludwig et al. |

(Continued)

FOREIGN PATENT DOCUMENTS

JP    5181639    7/1993

OTHER PUBLICATIONS

Joe Duran and Charlie Sauer; "Mainstream Videoconferencing—A Developer's Guide to Distance Multimedia"; Jan. 1997; pp. 73-74; Addison Wesley Longman, Inc.

(Continued)

*Primary Examiner* — Quoc D Tran
(74) *Attorney, Agent, or Firm* — Meyertons Hood Kivlin Kowert & Goetzel, P.C.; Jeffrey C. Hood; Joel L. Stevens

(57) ABSTRACT

Determining a videoconference layout based on numbers of participants. Videoconference data may be received from a plurality of videoconferencing endpoints. The videoconference data may include audio and video. Information may be stored which identifies a number of participants at each videoconferencing endpoint. Video from each of the videoconferencing endpoints may be combined to form composite video. The composite video may include portions corresponding to each of the plurality of videoconferencing endpoints. A respective size of each of the portions may be based on the information identifying the number of participants at each videoconferencing endpoint. The composite video may be provided to videoconferencing endpoint(s) over a network.

18 Claims, 9 Drawing Sheets

U.S. PATENT DOCUMENTS

| | | | |
|---|---|---|---|
| 5,625,410 | A | 4/1997 | Washino et al. |
| 5,629,736 | A | 5/1997 | Haskell et al. |
| 5,640,543 | A | 6/1997 | Farrell et al. |
| 5,649,055 | A | 7/1997 | Gupta et al. |
| 5,657,096 | A | 8/1997 | Lukacs |
| 5,684,527 | A | 11/1997 | Terui et al. |
| 5,689,641 | A | 11/1997 | Ludwig et al. |
| 5,719,951 | A | 2/1998 | Shackleton et al. |
| 5,737,011 | A | 4/1998 | Lukacs |
| 5,751,338 | A | 5/1998 | Ludwig, Jr. |
| 5,764,277 | A | 6/1998 | Loui et al. |
| 5,767,897 | A | 6/1998 | Howell |
| 5,768,263 | A | 6/1998 | Tischler et al. |
| 5,812,789 | A | 9/1998 | Diaz et al. |
| 5,821,986 | A | 10/1998 | Yuan et al. |
| 5,831,666 | A | 11/1998 | Palmer et al. |
| 5,838,664 | A | 11/1998 | Polomski |
| 5,841,763 | A | 11/1998 | Leondires et al. |
| 5,859,979 | A | 1/1999 | Tung et al. |
| 5,870,146 | A | 2/1999 | Zhu |
| 5,896,128 | A | 4/1999 | Boyer |
| 5,900,907 | A | 5/1999 | Malloy et al. |
| 5,914,940 | A | 6/1999 | Fukuoka et al. |
| 5,990,931 | A | 11/1999 | Nimri et al. |
| 5,991,277 | A | 11/1999 | Maeng et al. |
| 5,995,608 | A | 11/1999 | Detampel, Jr. et al. |
| 6,025,870 | A | 2/2000 | Hardy |
| 6,038,532 | A | 3/2000 | Kane et al. |
| 6,043,844 | A | 3/2000 | Bist et al. |
| 6,049,694 | A | 4/2000 | Kassatly |
| 6,078,350 | A | 6/2000 | Davis |
| 6,101,480 | A | 8/2000 | Conmy et al. |
| 6,122,668 | A | 9/2000 | Teng et al. |
| 6,128,649 | A | 10/2000 | Smith et al. |
| 6,160,573 | A | 12/2000 | Allen et al. |
| 6,195,184 | B1 | 2/2001 | Chao et al. |
| 6,243,129 | B1 | 6/2001 | Deierling |
| 6,281,882 | B1 | 8/2001 | Gordon et al. |
| 6,285,661 | B1 | 9/2001 | Zhu et al. |
| 6,288,740 | B1 | 9/2001 | Lai et al. |
| 6,292,204 | B1 | 9/2001 | Carleton et al. |
| 6,300,973 | B1 | 10/2001 | Feder et al. |
| 6,314,211 | B1 | 11/2001 | Kim et al. |
| 6,373,517 | B1 | 4/2002 | Davis et al. |
| 6,400,996 | B1 | 6/2002 | Hoffberg et al. |
| 6,453,285 | B1 | 9/2002 | Anderson et al. |
| 6,480,823 | B1 | 11/2002 | Zhao et al. |
| 6,496,216 | B2 | 12/2002 | Feder et al. |
| 6,526,099 | B1 | 2/2003 | Christopoulos et al. |
| 6,535,604 | B1 | 3/2003 | Provencal et al. |
| 6,564,380 | B1 | 5/2003 | Murphy |
| 6,590,604 | B1 | 7/2003 | Tucker et al. |
| 6,594,688 | B2 | 7/2003 | Ludwig et al. |
| 6,603,501 | B1 | 8/2003 | Parry et al. |
| 6,646,997 | B1 | 11/2003 | Baxley et al. |
| 6,654,045 | B2 | 11/2003 | Allen et al. |
| 6,657,975 | B1 | 12/2003 | Baxley et al. |
| 6,728,221 | B1 | 4/2004 | Shaffer et al. |
| 6,744,460 | B1 | 6/2004 | Nimri et al. |
| 6,757,005 | B1 | 6/2004 | Elbaz et al. |
| 6,760,415 | B2 | 7/2004 | Beecroft |
| 6,774,928 | B2 | 8/2004 | Bruzzone |
| 6,813,083 | B2 | 11/2004 | Kobayashi |
| 6,816,904 | B1 | 11/2004 | Ludwig et al. |
| 6,847,403 | B1 | 1/2005 | Forsberg, Jr. et al. |
| 6,909,552 | B2 | 6/2005 | Dohi et al. |
| 6,944,259 | B2 | 9/2005 | Yang |
| 6,967,321 | B2 | 11/2005 | Leong et al. |
| 7,057,636 | B1 | 6/2006 | Cohen-Solal et al. |
| 7,089,285 | B1 | 8/2006 | Drell |
| 7,133,062 | B2 | 11/2006 | Castles et al. |
| 7,312,809 | B2 | 12/2007 | Bain et al. |
| 7,321,384 | B1 | 1/2008 | Wu et al. |
| 7,330,541 | B1 | 2/2008 | Surazski et al. |
| 7,339,605 | B2 | 3/2008 | Rodman et al. |
| 7,554,571 | B1 | 6/2009 | Beck et al. |
| 2002/0133247 | A1 | 9/2002 | Smith et al. |
| 2002/0188731 | A1 | 12/2002 | Potekhin et al. |
| 2003/0174146 | A1 | 9/2003 | Kenoyer |
| 2003/0232648 | A1 | 12/2003 | Prindle |
| 2004/0113939 | A1 | 6/2004 | Zacks et al. |
| 2004/0183897 | A1 | 9/2004 | Kenoyer et al. |
| 2004/0263610 | A1 | 12/2004 | Whynot et al. |
| 2005/0198134 | A1 | 9/2005 | Kenoyer et al. |
| 2006/0013416 | A1 | 1/2006 | Truong et al. |
| 2006/0087553 | A1 | 4/2006 | Kenoyer et al. |
| 2006/0244817 | A1* | 11/2006 | Harville et al. ............ 348/14.08 |
| 2006/0259552 | A1 | 11/2006 | Mock et al. |
| 2006/0277254 | A1 | 12/2006 | Kenoyer et al. |
| 2007/0009113 | A1 | 1/2007 | Kenoyer et al. |
| 2007/0009114 | A1 | 1/2007 | Kenoyer et al. |
| 2007/0165106 | A1 | 7/2007 | Groves et al. |
| 2010/0002069 | A1* | 1/2010 | Eleftheriadis et al. ..... 348/14.08 |
| 2011/0025819 | A1* | 2/2011 | Gorzynski et al. ......... 348/14.07 |
| 2011/0102539 | A1* | 5/2011 | Ferren ....................... 348/14.08 |

OTHER PUBLICATIONS

"A history of video conferencing (VC) technology" <http://web.archive.org/web/20030622161425/http://myhome.hanafos.com/~soonjp/vchx.html> (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; <http://www.video.ja.net/intro/>; 2001.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; <http://www.medlib.iupui.edu/techsupport/vc/vcinstructions.html>; 2002; 3 pages.

E. J. Addeo, A. D. Gelman and A. B. Dayao; "A Multi-media Multipoint Communication Services Capability for Broadband Networks"; Mar. 1987; pp. 423-428; Bell Communications Research; Morristown, NJ.

U.S. Appl. No. 12/142,263, entitled "Virtual decoders", by King, et al., filed Jun. 19, 2008.

U.S. Appl. No. 12/142,340, entitled "Video Conferencing Device which Performs Multi-way Conferencing", by King, et al., filed Jun. 19, 2008.

U.S. Appl. No. 12/142,377, entitled "Video Decoder which Processes Multiple Video Streams", by King, et al., filed Jun. 19, 2008.

U.S. Appl. No. 12/171,358, entitled "Virtual Multiway Scaler Compensation", by King, et al., filed Jul. 11, 2008.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Aurel A. Lazar and Koon-Seng Lim; "Programmability and Service Creation for Multimedia Networks"; Fifth IEEE International Symposium on High Performance Distributed Computing; 1996; pp. 217-223.

"Eye-to-Eye Video"; Retrieved from the Internet: <http://itotd.com/articles/254/eye-to-eye-video/>; Jul. 23, 2004; 6 pages.

"Free2C 3D-Display" (web archive: <http://www.hhi.fraunhofer.de/english/im/products/Cebit/free2C/free2C.html> dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpeech Press.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of the International Society for Optical Engineering; May 1997; p. 12.

Jefferson Han and Brian Smith; "CU-SeeMe VR Immersive Desktop Teleconferencing"; Proceeding of the Fourth ACM international conference on Multimedia; 1997; pp. 199-207.

David McAllister; "Display Technology: Stereo & 3D Display Technologies" North Carolina State University, http://web.archive.org/web/20031206213341/http://research.csc.ncsu.edu/stereographics/wiley.pdf (date or web archive Dec. 6, 2003); 50 pages.

Lars Weinand; "3D Stereo Technology: Is it Ready for Prime Time?"; http://www.tomshardware.com/2005/05/02/3d_stereo_technology; May 2, 2005; 40 pages.

"Technical Handbook"; North Dakota Interactive Video Network; Jan. 2003; 38 pages.

Fengmin Gong; "Multipoint Audio and Video Control for Packet-Based Multimedia Conferencing"; Proceedings of the 2nd Association for Computing Machinery International Conference on Multimedia; San Francisco, CA; 1994; pp. 425-432.

Alexander Sawchuk, Isaac Cohen, Chris Kyriakakis, and Albert Rizzo; "Three Dimensional Interaction with Autostereoscopic Displays" Apr. 2004; 8 pages.

* cited by examiner

… (1)

DETERMINING A VIDEOCONFERENCE LAYOUT BASED ON NUMBERS OF PARTICIPANTS

FIELD OF THE INVENTION

The present invention relates generally to videoconferencing and, more specifically, to a method for determining a videoconference layout based on numbers of participants.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference).

During videoconferences, each location may have varying numbers of participants. However, the layout presented for each location is not sensitive to the number or relative locations of participants. Accordingly, improvements in videoconferencing are desired.

SUMMARY OF THE INVENTION

Various embodiments are presented of a system and method for determining a videoconference layout based on numbers and/or relative location of participants.

A videoconference may be initiated between a plurality of participants at respective participant locations. The videoconference may be performed using a plurality of videoconferencing endpoints at each of the participant locations. Thus, each videoconferencing endpoint may be used for communication by each participant at each participant location to participate in the videoconference. At least two participants may use a first videoconferencing endpoint at a first location. Additionally, one or more participants may use a second videoconferencing endpoint at a second location. The number of participants at the first location may be greater than the number of participants at the second location. Additionally, seating arrangements may be different leading to different spread of people in a room.

During the videoconference, videoconference data may be received from the plurality of videoconferencing endpoints. The videoconference data may include audio and video.

Information identifying the number of participants at each location may be determined. Thus, the information may identify the at least two participants at the first location and the one or more participants at the second location. According to various embodiments, the information may be determined from the received videoconference data. For example, facial recognition may be performed on the received video data from the videoconferencing endpoints. Additionally, or alternatively, a number of unique voices may be identified from the received audio data from the videoconferencing endpoints. Thus, in one embodiment, the number of participants at each location may be determined based on the received videoconferencing data. However, in some embodiments, the number of participants may simply be provided, e.g., from each videoconferencing unit. In another embodiment, the number of participants may come from scheduling & management systems, may be aware of the scheduled participants and their locations.

Video from at least a subset of the plurality of videoconferencing endpoints may be combined to form composite video. The subset of the plurality of videoconferencing endpoints may include the first videoconferencing endpoint and possibly the second videoconferencing endpoint. The composite video may include respective portions corresponding to each of the subset of the plurality of videoconferencing endpoints, thus forming a layout. The size of the portion corresponding to the first videoconferencing endpoint may be based on the information identifying the number of participants at each location. More specifically, the size of the portion may be scaled based on the number of participants at the respective location. Thus, the portion of the composite video corresponding to the first location may be larger in size than the portion of the composite video corresponding to the second location since the first location has a larger number of participants than the second location. Thus, the layout of the composite video may be "people sensitive", e.g., may be generated or determined based on the number of participants at each location.

The composite video may include an "active" portion which is larger than the other portions. For example, the "active" portion may be reserved for the participant who is currently speaking, or on whom emphasis is being placed. Alternatively, the active portion may have a data presentation or video being presented. The portion of the composite video corresponding to the first location may not be the active portion. More specifically, in one embodiment, the size of the active portion may always be larger than the other portions (e.g., regardless of the number of participants associated with the active portion). However, the relative sizes of the other portions, which are not active, may be dependent on the number of participants. Thus, following the example from above, neither the portion corresponding to the first location nor the second location may be the active portion, but the first portion may be larger than the second portion, based on the number of participants at the first and second locations.

The composite video may be provided over a network to one or more of the videoconferencing endpoints. Note that the composite video may be different for each of the plurality of videoconferencing endpoints, and thus, the combination of video may be performed on a per endpoint basis, as desired.

The determination or storing of the information identifying the number of participants, the combining of the video to form composite video, and the providing of the composite video may be performed a plurality of times in a dynamic fashion to adjust the size of the respective portions based on the number of participants at the respective locations. Thus, in some embodiments, the number of participants may change at one or more of the locations, and the size of the portions of the composite video may be updated based on the changes to the number of participants. Thus, the information identifying the number of participants may be updated, e.g., in a periodic fashion, and the video may be combined based on that updated information during the videoconference.

BRIEF DESCRIPTION OF THE DRAWINGS

A better understanding of the present invention may be obtained when the following detailed description is considered in conjunction with the following drawings, in which.

Figure 1:
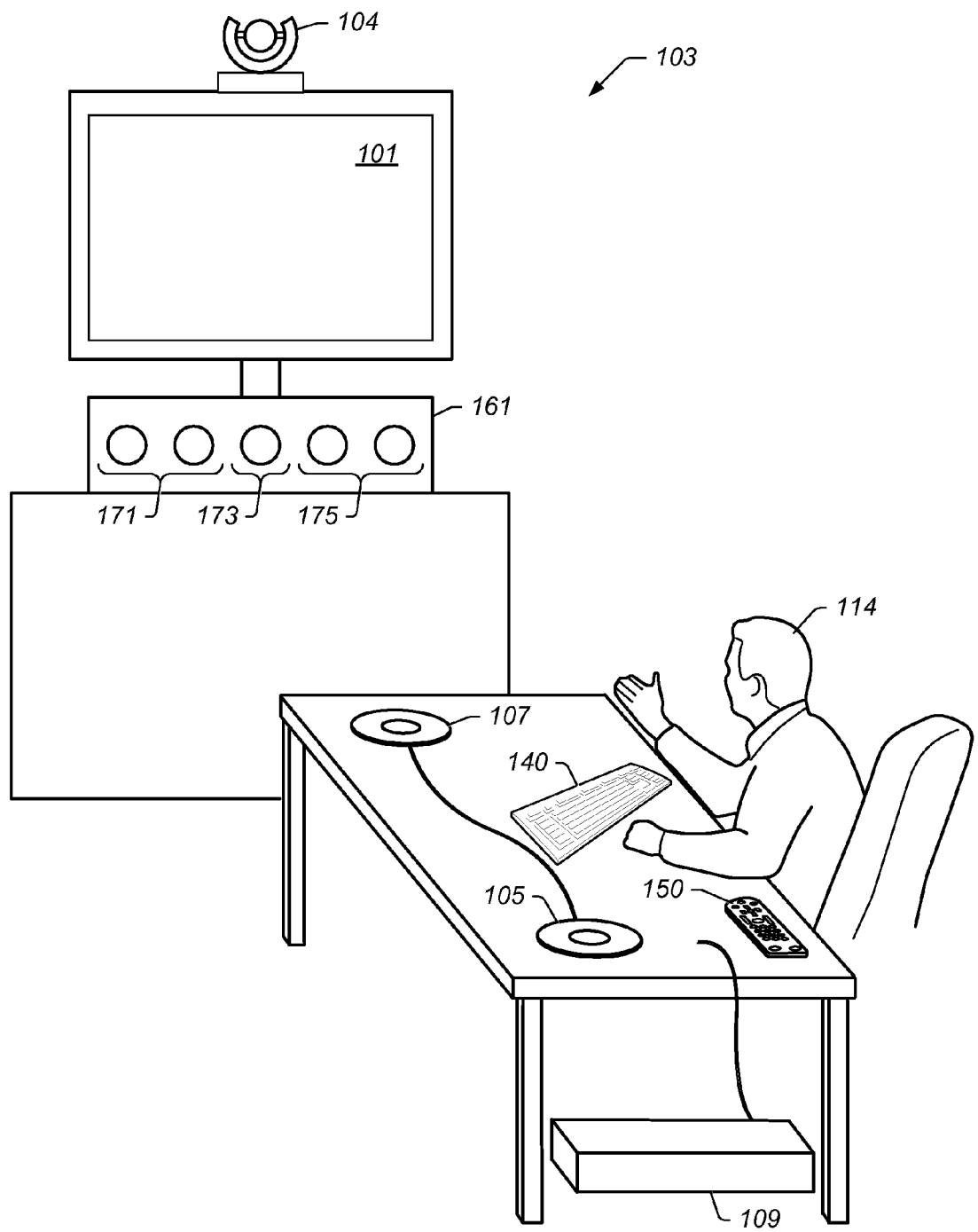
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

During a videoconference, the participant location of FIGS. 1 and 2 may display or construct a layout which is based on the number of participants at each respective participant location, as described herein.

Figure 3A:
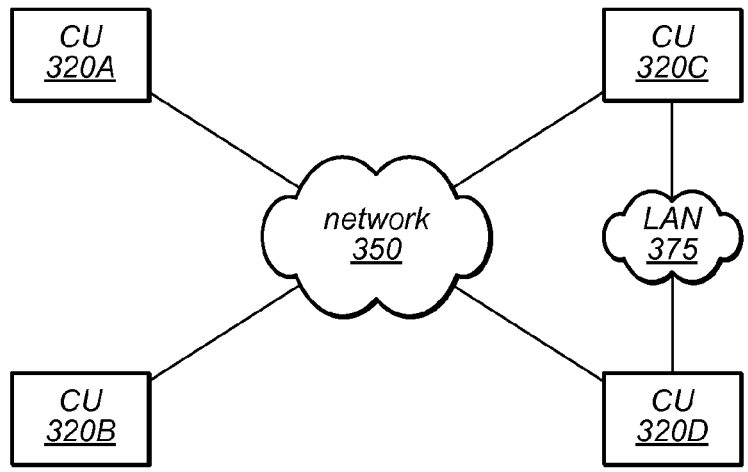
FIGS. 3A and 3B illustrate exemplary conferencing systems coupled in different configurations, according to some embodiments.
Figure 3B:
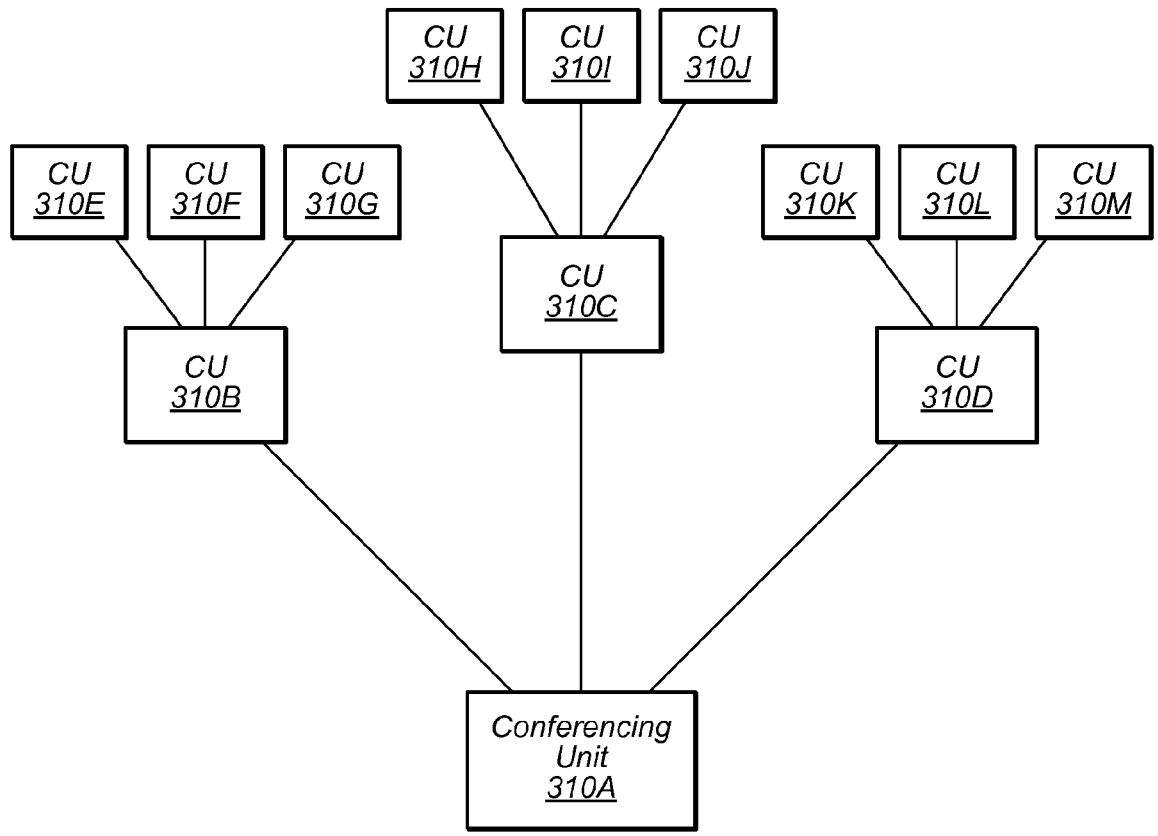

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
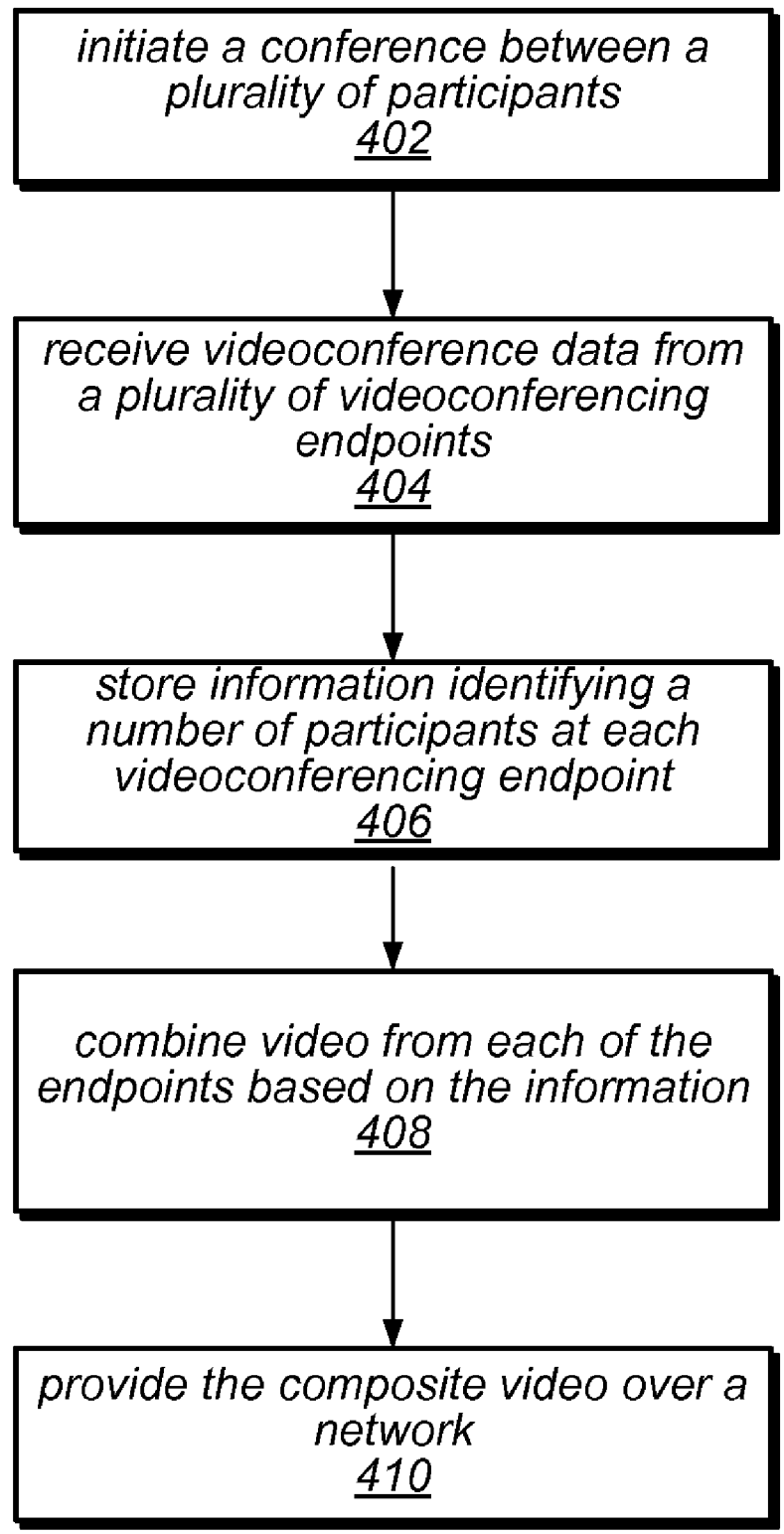
FIG. 4 is a flowchart diagram illustrating an exemplary method for determining a videoconference layout based on numbers of participants, according to an embodiment.

FIG. 4—Determining a Videoconference Layout

FIG. 4 illustrates a method for determining a videoconference layout based on numbers of participants. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a videoconference may be initiated between a plurality of participants at respective participant locations. The videoconference may be performed using a plurality of videoconferencing endpoints at each of the participant locations. Thus, each videoconferencing endpoint, such as those described in FIGS. 1 and 2, may be used for communication by each participant at each participant location to participate in the videoconference. At least two participants may use a first videoconferencing endpoint at a first location. Additionally, one or more participants may use a second videoconferencing endpoint at a second location. The number of participants at the first location may be greater than the number of participants at the second location The conference may be established and performed according to any of a variety of methods, e.g., the one described in patent application Ser. No. 11/252,238, which was incorporated by reference above. The videoconference may utilize an instant messaging service or videoconferencing service over the Internet, as desired. In some embodiments, the videoconference may be initiated in response to a user placing a videoconferencing call at one of the locations. Alternatively, or additionally, the videoconference may be initiated by a host or MCU of the videoconference.

In 404, during the videoconference, videoconference data may be received from the plurality of videoconferencing endpoints. The videoconference data may include audio and video. The videoconference data may be received by a host or MCU of the videoconference and/or videoconferencing endpoints of the videoconference.

In 406, information identifying the number of participants at each location may be determined. Thus, the information may identify the at least two participants at the first location and the one or more participants at the second location.

In various embodiments, the information may be determined locally, e.g., by each videoconferencing endpoint, or remotely, e.g., by a host videoconferencing device and/or an MCU. More specifically, in some embodiments, the information may be determined from the received videoconference data. For example, analysis may be performed on the videoconference data of each endpoint to determine the number of participants. In one embodiment, facial recognition may be performed on the received video data from the videoconferencing endpoints to determine the number of participants at each endpoint. Additionally, or alternatively, a number of unique voices may be identified from the received audio data from the videoconferencing endpoints to determine the number of participants at each endpoint. Thus, in one embodiment, the number of participants at each location may be determined based on the respective received videoconferencing data. Thus, the determination may be based on the video and/or audio data from each videoconferencing endpoint.

However, in some embodiments, the number of participants may simply be provided, e.g., from each videoconferencing unit. Thus, in such embodiments, each videoconferencing endpoint (or other device) may determine the number of participants at the participant location and may provide the information identifying the determined number of participants to the host videoconferencing device or MCU.

In 408, video from at least a subset of the plurality of videoconferencing endpoints may be combined to form composite video. The subset of the plurality of videoconferencing endpoints may include the first videoconferencing endpoint and possibly the second videoconferencing endpoint. The composite video may include respective portions corresponding to each of the subset of the plurality of videoconferencing endpoints, thus forming a layout. The size of the portion corresponding to the first videoconferencing endpoint may be based on the information identifying the number of participants at each location. More specifically, the size of the portion may be scaled based on the number of participants at the respective location, e.g., relative to the number of participants at other locations. Thus, the portion of the composite video corresponding to the first location may be larger in size than the portion of the composite video corresponding to the second location, since the first location has a larger number of participants than the second location. Thus, the layout of the composite video may be "people sensitive", e.g., may be generated or determined based on the number of participants at each location.

The composite video may include an "active" portion which is larger than the other portions. For example, the "active" portion may be reserved for the participant who is currently speaking, or on whom emphasis is being placed. In some embodiments, the active portion may be of a fixed size, or fixed proportion of the composite video. Alternatively, the active portion may have a data presentation or video being presented. Note that the video content shown in the active portion may not be shown in the non-active portion of the layout. For example, if a participant is shown in the active portion, that participant may not be shown in any other portion of the layout, although in alternative embodiments, this may be possible.

The portion of the composite video corresponding to the first location may not be the active portion. More specifically, in one embodiment, the size of the active portion may always be larger than the other portions (e.g., regardless of the number of participants associated with the active portion). However, the relative sizes of the other portions, which are not active (i.e., nonactive portions), may be dependent on the number of participants. Thus, following the example from above, neither the portion corresponding to the first location nor the second location may be the active portion, but the first portion may be larger than the second portion, since there is a larger number of participants at the first location than the second location. Further examples of videoconferences and layouts with differing numbers of participants are provided and described below.

In 410, the composite video may be provided over a network to one or more of the videoconferencing endpoints.

As already indicated, the method may be performed by various endpoints or conferencing units, but may also be performed by transceivers, MCUs, transcoders, or any other intervening equipment between endpoints of the conference, as desired. For example, in one embodiment, the host or MCU may receive videoconference data from each of the locations, determine the number of participants at each location, and generate a layout for each location based on the number of participants. Thus, the composite video may be different for each of the plurality of videoconferencing endpoints, and correspondingly, the combination of video may be performed on a per endpoint basis. For example, the MCU may generate a layout that does not include the audio/video of the participants to which the composite video is being sent. Thus, each layout may be specific to each endpoint location.

In further embodiments, the method may be performed locally by each or a subset of the videoconferencing endpoints. For example, each endpoint may receive videoconference data and locally generate a layout for the participants at the endpoint location. Accordingly, the method described above may be performed by each videoconferencing endpoint to generate its own layout in a "people sensitive" manner.

Additionally, layouts may be determined locally by each videoconferencing endpoint (e.g., in an automatic fashion, without any user input, or manually, where a participant selects a desired layout) and that information may be provided to the MCU for generating the determined layout. In such embodiments, the numbers of participants at each location may be determined locally by the endpoint, or remotely, e.g., by the MCU, which may send the information out to one or more of the videoconferencing endpoints. In some embodiments, where the layout is selected by participants, the options available for selection may be automatically determined based on the number of participants. Thus, the choices available to the user may be automatically determined, even where the ultimate choice is not made in an automatic fashion.

Thus, the method described above may be performed by various different devices involved in the videoconference.

The determination or storing of the information identifying the number of participants, the combining of the video to form composite video, and the providing of the composite video may be performed a plurality of times in a dynamic fashion to adjust the size of the respective portions based on the number of participants at the respective locations. Thus, in some embodiments, the number of participants may change at one or more of the locations, and the size of the portions of the composite video may be updated based on the changes to the number of participants. For example, if one or more people (participants) leave a participant location or endpoint, i.e., leave the videoconference, the size of the composite video allocated to this participant location may correspondingly be reduced. In a similar manner, if one or more people (participants) walk into a room to join a participant location or endpoint in a videoconference, i.e., one or more people join the videoconference, the size of the composite video allocated to this participant location may correspondingly be increased based.

Additionally, the participant location or data provided in the active portion may also change throughout the videoconference. In these cases, the combined video (e.g., the layout) may dynamically change to accommodate the changing number of participants in the non-active portions of the combined video. For example, in a five participant videoconference, where one of the locations has two participants, the active portion may show one participant at one time, two participants at another time, or no participants at a further time. During each time, the number of participants shown in the non-active portion may change (e.g., from 4 to 3 to 5, respectively). Correspondingly, in order to maintain a consistent portion for each non-active portion, the layout may change dynamically as the number of participants in the active portion changes. Alternatively, the layout may be static to avoid a constant change of the layout, which may be distracting to some participants. Such behavior may be controlled by one or more settings, e.g., set by participants for their respective videoconferencing endpoints.

Thus, the information identifying the number of participants may be updated, e.g., in a periodic fashion, and the video may be combined based on that updated information during the videoconference. For example, the number of participants may be determined or checked, e.g., every 5 seconds, 10 seconds, 30 seconds, minute, or upon notification of a change in the number of participants.

In further embodiments, the method may suggest optimal settings based on the number of participants for each location. For example, the method may determine various audio and visual settings. In one embodiment, the method may suggest optimal pan, tilt, and zoom settings for optimal coverage of a video input device.

FIGS. 5-9—Exemplary Layouts

FIGS. 5-9 provide exemplary illustrations of videoconferences and layouts that may correspond to embodiments of the method of FIG. 4. These Figures are exemplary only and do not limit the scope of the methods described herein.

Figure 5:
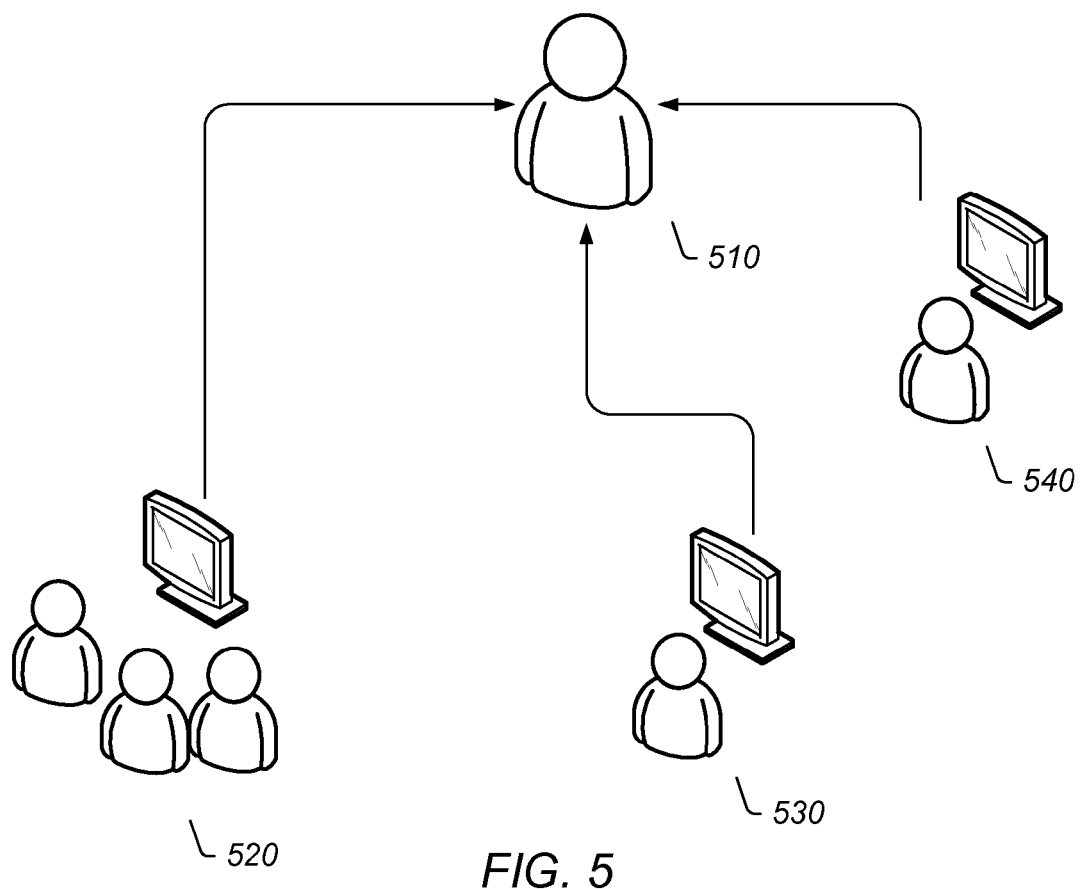
FIGS. 5-9 illustrate various videoconferences and corresponding layouts, according to some embodiments.

FIG. 5 illustrates a videoconference where four videoconferencing endpoints/locations are participating in the videoconference. More particularly, three participants at location 520, one participant at location 530, and one participant at location 540 are connected to a single participant who is hosting the videoconference at location 510.

Figure 6:
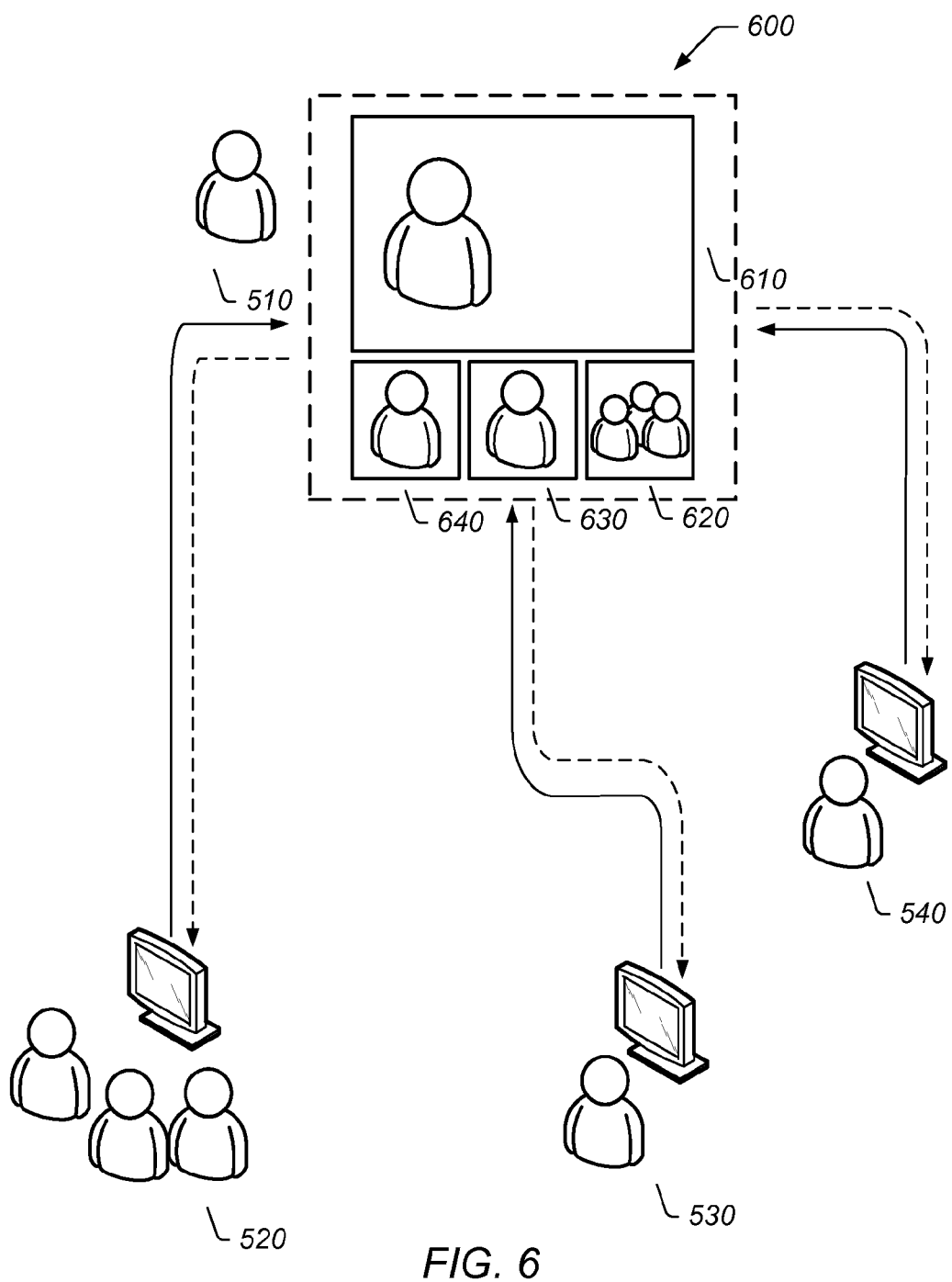

FIG. 6 illustrates a videoconference whose layout 600 is not "people sensitive" and does not comport to the methods described herein. As shown in this Figure, the layout 600 is provided to each of the videoconferencing endpoints at 520, 530, and 540. In this layout, the active portion 610 corresponds to videoconferencing endpoint 510 (who is actively speaking or presenting). The remaining portions 640, 630, and 620 each correspond to the respective videoconferencing endpoints at locations 520, 530, and 540. As shown in this layout, the size of each portion of 640, 630, and 620 is identical to the other portions regardless of the number of participants. Thus, the relative size of the portion per person is different since there are 3 participants at location 520 compared to the single participants at locations 530 and 540. Thus, this videoconference layout is not ideal and does not comport with the methods described herein.

Figure 7A:
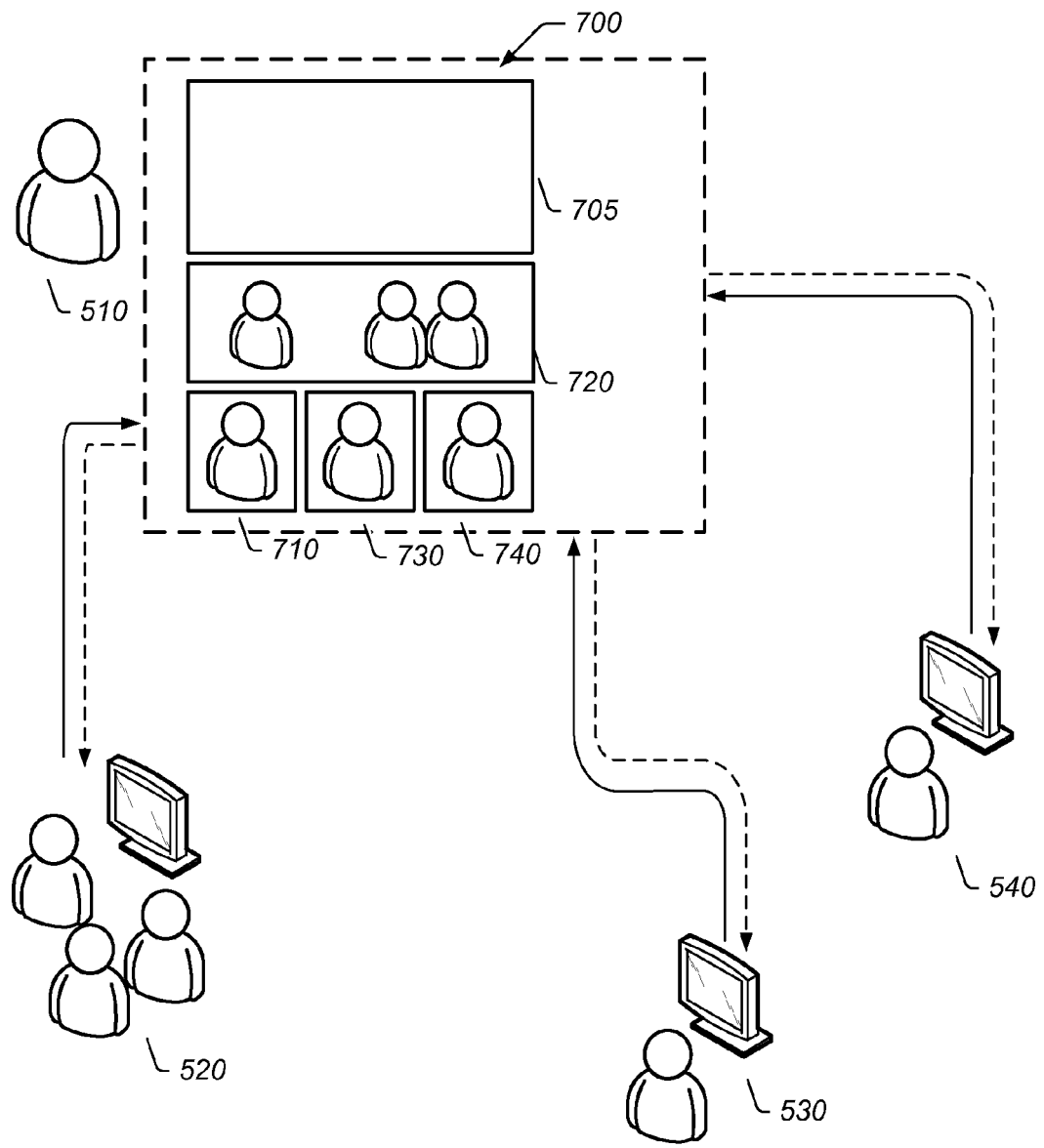

FIG. 7 illustrates a layout 700 which is "people sensitive". As shown in this Figure, each participant is given the same relative amount of space in the layout (separate from the active space 705, which may be displaying a data presentation, video, etc.). In this case, the three participants at location 520 are given the same amount of space as the three separate participants at locations 510, 530, and 540. Thus, each participant is given his "fair share" of the layout for the videoconference.

Figure 8:
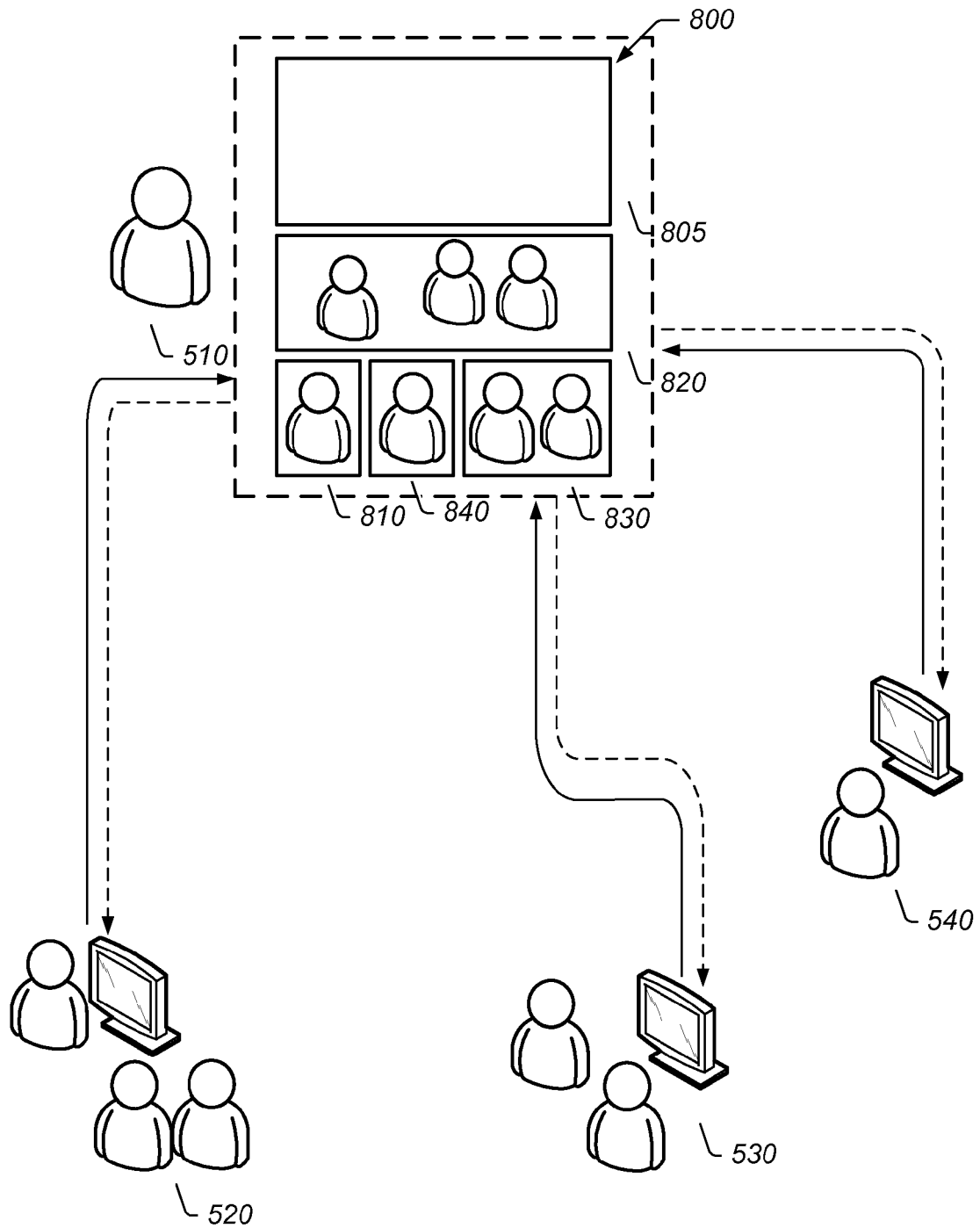

FIG. 8 illustrates a layout 800 of a videoconference where more than one location has a plurality of participants. In this case, locations 510, 520, and 540 have the same number of participants as in the previous Figures, but location 530 has two participants instead of one. As shown, separate from active portion 805, each participant is given approximately the same amount of space in the layout. More specifically, the three participants of location 520 are given the same amount of space in portion 820 as the four participants in 530, 540, and 510 (portions 810, 840, and 830, respectively). The four participants (two from 530, one from 510, and one from 540) are also given the same amount of space relative to each other in portions 810, 840, and 830. Thus, the method may attempt to give each participant a same relative amount of space in the layout regardless of the participant's location. As shown in this example, where the exact same space cannot be given (or at least is awkward to give), the method may give approximately the same space (e.g., within 10%, 25%, etc.).

Figure 9C:
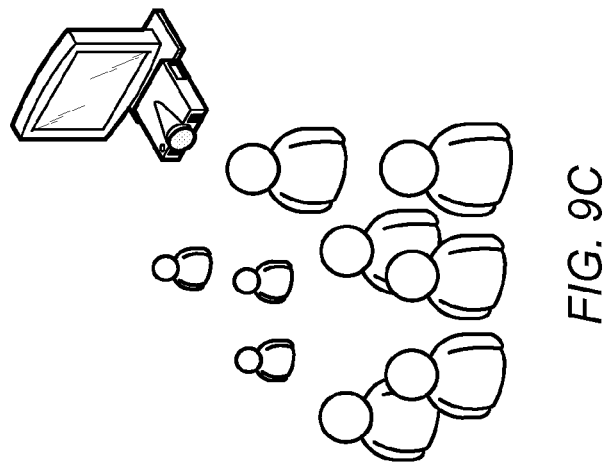
Figure 9B:
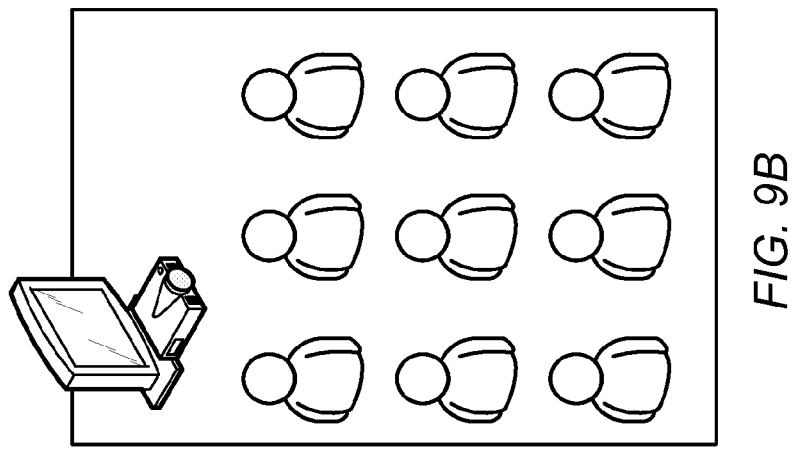
Figure 9A:
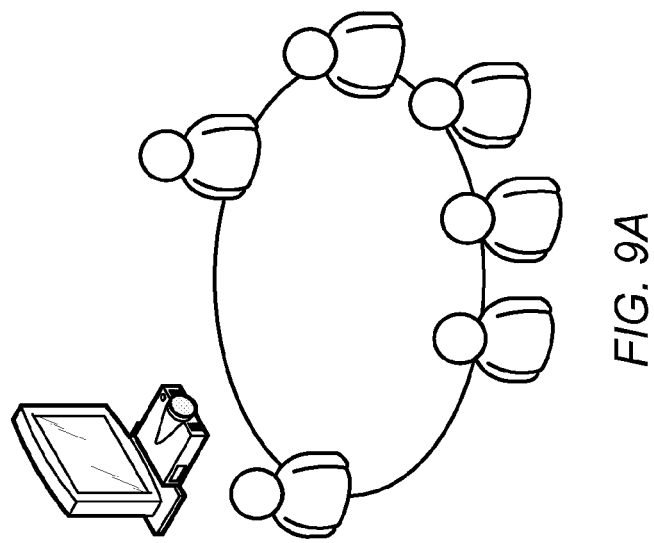

FIGS. 9A-9C illustrate various different configurations to which the method described above may be applied. More specifically, regardless of the particular configuration of people at a videoconferencing location, the method may determine the number of participants and apportion an appropriate amount of space in the layout for each location based on that determined number of participants. As shown, the participants may be seated around a circular table in 9A, in a grid (e.g., in chairs) in 9B, or in an arbitrary configuration in 9C.

In more detail, the method described above may be able to compensate for the configuration of the participant location. For example, as shown in various configurations of FIGS. 9A-9C, the participant location may include a round table, a rectangular table, or no table at all, according to various possibilities. Typically, a circular configuration may be most desirable. Additionally, the method may be able to handle different meeting room sizes. Although the table size is typically proportional to the meeting room size, this may not always be the case. The method may also be able to accommodate and detect the number of participants when the spacing between people varies. For example, spacing may typically be consistent between participants, but this may not always occur.

Finally, the method may be able to handle large rooms, with many participants (e.g., more than 5 or 10 participants). In one embodiment, where a large room is covered by multiple cameras, the local endpoint may shift to the camera nearest to the dominant talker.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In another embodiment, the composite video of a videoconference includes respective portions corresponding to each of a subset of the plurality of videoconferencing endpoints, thus forming a layout. In this embodiment, the size of the portion in the layout corresponding to each of one or more of the videoconferencing endpoints may be based on the relative amount of physical space occupied by the participants at that endpoint. More specifically, the size of the portion may be scaled based on the relative physical space occupied by the participants at the respective location. Thus, where first and second locations have the same number of participants, and the participants at the first location are more "spread out", i.e., there is a larger amount of empty space between the participants at the first location than at the second location, then in the layout the portion of the composite video corresponding to the first location may be larger in size than the portion of the composite video corresponding to the second location. Thus, the layout of the composite video may be "space sensitive", e.g., may be generated or determined based on the amount of space taken by the participants at each location.

In one embodiment, the method performs facial recognition to determine, e.g., the leftmost and rightmost participant at a participant location. The method can then determine the amount of space occupied at this participant location between the leftmost and rightmost participants at the participant location. The method can perform this operation at each participant location, determine the amount of space occupied by the participants at each location, and then assign a size of the video portion in the videoconferencing layout based on the relative space occupied by the participants at each endpoint.

In further embodiments, instead of providing different sizes for the different locations based on the number of participants, the method may provide an individual portion for each participant regardless of their location. For example, where three participants are at a first location, the images of each of the three participants may be isolated from each other and shown in their own portion in the layout. Thus, where there is one participant at one location and three at another, four portions may be shown in the layout, one for each participant. Such isolation may be performed by identifying the number and locations of each participant, selectively removing that portion from a video feed, and displaying each isolated portion as an individual portion in the layout. Alternatively, where a camera is used for each person, the individual camera feeds may be used for respective portions, thereby avoiding the potentially hardware intensive isolation procedures described above.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer accessible memory medium storing program instructions for performing a videoconference, wherein the program instructions are executable to implement:
   receiving videoconference data from a plurality of videoconferencing endpoints, wherein the videoconference data comprises audio and video;
   automatically determining information identifying a number of participants at each videoconferencing endpoint;
   storing the information;
   combining video from each of the plurality of videoconferencing endpoints to form composite video, wherein the composite video comprises portions corresponding to each of the plurality of videoconferencing endpoints, wherein a respective size of each of the portions is based on the information; and
   providing the composite video over a network.

2. The memory medium of claim 1, wherein there is a first number of participants at a first videoconferencing endpoint, wherein there is a second number of participants at a second videoconferencing endpoint, wherein the first number is larger than the second number, and wherein the size of the portion corresponding to the first videoconferencing endpoint is larger than the size of the portion corresponding to the second videoconferencing endpoint based on the first number being larger than the second number.

3. The memory medium of claim 1, wherein said automatically determining, said storing, said combining, and said providing are performed a plurality of times in a dynamic fashion to adjust the size of the respective portions based on the number of participants at the respective videoconferencing endpoints.

4. The memory medium of claim 3, wherein, at one or more of the videoconferencing endpoints, the number of participants changes during the videoconference.

5. The memory medium of claim 1, wherein the program instructions are further executable to implement:
   updating the information in a periodic fashion.

6. The memory medium of claim 1, wherein the information is based on facial recognition of the video received from each of the videoconferencing endpoints.

7. The memory medium of claim 1, wherein the information is based on unique voices of the audio received from each of the videoconferencing endpoints.

8. The memory medium of claim 1, wherein the information is provided from each of the plurality of videoconferencing endpoints.

9. A method for performing a videoconference, comprising:
   receiving videoconference data from a plurality of videoconferencing endpoints, wherein the videoconference data comprises audio and video, wherein the videoconference is performed using the plurality of videoconferencing endpoints at respective locations, wherein at least two participants use a first videoconferencing endpoint at a first location;
   automatically determining information identifying a number of participants at each videoconferencing endpoint wherein the information identifies the at least two participants at the first location;
   storing the information;
   combining video from at least a subset of the plurality of videoconferencing endpoints to form composite video, wherein the subset of the plurality of videoconferencing endpoints comprises the first videoconferencing endpoint, wherein the composite video comprises respective portions corresponding to each of the subset of the plurality of videoconferencing endpoints, and wherein the size of the portion corresponding to the first videoconferencing endpoint is based on the information;
   providing the composite video over a network.

10. The method of claim 9, wherein one or more participants use a second videoconferencing endpoint at a second location, wherein the one or more participants are less than the at least two participants, wherein the information identifies the one or more participants at the second location, wherein the subset of the plurality of videoconferencing endpoints comprises the second videoconferencing endpoint, and wherein the size of the portion corresponding to the second videoconferencing endpoint is smaller than the size of the portion corresponding to the first videoconferencing endpoint based on the information.

11. The method of claim 9, wherein said automatically determining, said storing, said combining, and said providing are performed a plurality of times in a dynamic fashion to adjust the size of the respective portions based on the number of participants at the respective locations.

12. The method of claim 11, wherein, at one or more of the locations, the number of participants changes during the videoconference.

13. The method of claim 9, further comprising: updating the information in a periodic fashion.

14. The method of claim 9, wherein the information is based on facial recognition of the video received from the first videoconferencing endpoint.

15. The method of claim 9, wherein the information is based on unique voices of the audio received from the first videoconferencing endpoint.

16. The method of claim 9, wherein the information is provided from one or more of the plurality of videoconferencing endpoints.

17. The method of claim 9, wherein the composite video comprises an active portion which is larger than the other portions and wherein the portion of the composite video corresponding to the first videoconferencing endpoint is not the active portion.

18. A system for performing a videoconference, comprising:
- a processor;
- an input coupled to the processor and a network;
- an output coupled to the processor and the network; and
- a memory medium coupled to the processor, wherein the memory medium stores program instructions executable by the processor to implement:
  - receiving videoconference data from a plurality of videoconferencing endpoints via the input, wherein the videoconference data comprises audio and video, wherein the videoconference is performed using the plurality of videoconferencing endpoints at respective locations, wherein a first number of participants use a first videoconferencing endpoint at a first location and wherein a second number of participants use a second videoconferencing endpoint at a second location, and wherein the first number is greater than the second number;
  - automatically determining the number of participants at each location using the videoconference data, wherein said determining identifies the first number of participants at the first location and the second number of participants at the second location;
  - combining video from at least a subset of the plurality of videoconferencing endpoints to form composite video, wherein the subset of the plurality of videoconferencing endpoints comprises the first videoconferencing endpoint and the second videoconferencing endpoint, wherein the composite video comprises a first portion corresponding to the first videoconferencing endpoint and a second portion corresponding to the second videoconferencing endpoint, wherein sizes of the portions of the composite video are based on the information, wherein the first portion is larger than the second portion;
  - providing the composite video to one or more of the videoconferencing endpoints via the output.

* * * * *